United States Patent
Sims et al.

(10) Patent No.: US 9,381,449 B2
(45) Date of Patent: Jul. 5, 2016

(54) CARBON NANOTUBE COMPOSITE MEMBRANE

(71) Applicant: IDEX Health & Science, LLC, Rohnert Park, CA (US)

(72) Inventors: Carl W. Sims, Santa Rosa, CA (US); Quan Liu, Petaluma, CA (US)

(73) Assignee: IDEX Health & Science LLC, Rohnert Park, CA (US)

( * ) Notice: Subject to any disclaimer, the term of this patent is extended or adjusted under 35 U.S.C. 154(b) by 247 days.

(21) Appl. No.: 13/911,433

(22) Filed: Jun. 6, 2013

(65) Prior Publication Data
US 2015/0027304 A1    Jan. 29, 2015

(51) Int. Cl.
*B01D 19/00* (2006.01)
*B01D 53/22* (2006.01)

(52) U.S. Cl.
CPC .................. *B01D 19/0031* (2013.01)

(58) Field of Classification Search
CPC . B01D 19/0031; B01D 53/228; B01D 71/021
USPC ............ 95/46; 96/4, 6, 11; 210/638, 651, 653
See application file for complete search history.

(56) References Cited

U.S. PATENT DOCUMENTS

| 5,238,471 A | 8/1993 | Blanchet-Fincher |
|---|---|---|
| 5,273,572 A | 12/1993 | Baker |
| 5,281,255 A | 1/1994 | Toy |
| 5,340,384 A | 8/1994 | Sims et al. |
| 5,749,942 A | 5/1998 | Bilven et al. |
| 5,876,604 A | 3/1999 | Nemser et al. |
| 5,885,332 A | 3/1999 | Gerner et al. |
| 5,902,747 A | 5/1999 | Nemser |
| 5,914,154 A | 6/1999 | Nemser |
| 6,126,721 A | 10/2000 | Nemser et al. |
| 6,190,436 B1 | 2/2001 | Ji |
| 6,248,157 B1 | 6/2001 | Sims et al. |
| 6,299,777 B1 | 10/2001 | Bowser |
| 6,309,444 B1 | 10/2001 | Sims et al. |
| 6,478,852 B1 | 11/2002 | Callaghan |

(Continued)

FOREIGN PATENT DOCUMENTS

| JP | 2008214130 | 9/2008 |
|---|---|---|
| KR | 1020120027960 | 3/2012 |

(Continued)

OTHER PUBLICATIONS

R. L Schoeppner et al. "Nanomechanical Properties of Teflon Amorphous Fluoropolymer—MWCNT Bilayer Films." MRS Proceedings, vol. 1424, Materials Research Society DOI:10.1557/opl.2012. 4. 2012.

(Continued)

*Primary Examiner* — Jason M Greene
(74) *Attorney, Agent, or Firm* — Haugen Law Firm PLLP

(57) ABSTRACT

A composite membrane for separations includes a fabric with a non-woven array of intermingled carbon nanotubes, and a dopant incorporated with the fabric to form a non-porous, permeable composite. The composite membrane may be used to separate a target gas from a liquid by mounting the composite membrane in a housing chamber, and conditioning a permeate side of the chamber to establish a driving force for the target gas across the non-porous, permeable composite membrane.

19 Claims, 3 Drawing Sheets

(56) References Cited

U.S. PATENT DOCUMENTS

| | | | |
|---|---|---|---|
| 6,494,938 B2 | 12/2002 | Sims et al. | |
| 6,596,058 B2 | 7/2003 | Gerner et al. | |
| 6,678,051 B2 | 1/2004 | Gerner et al. | |
| 6,723,152 B2 | 4/2004 | Bikson | |
| 6,734,961 B2 | 5/2004 | Gerner et al. | |
| 6,755,893 B2 | 6/2004 | Peinemann | |
| 6,837,992 B2 | 1/2005 | Gerner | |
| 6,923,846 B2 | 8/2005 | Nelson | |
| 6,949,132 B2 | 9/2005 | Thielen | |
| 7,111,503 B2 | 9/2006 | Brumboiu | |
| 7,378,040 B2 | 5/2008 | Luo et al. | |
| 7,611,579 B2 | 11/2009 | Lashmore et al. | |
| 7,695,609 B2 | 4/2010 | Soundarrajan et al. | |
| 7,713,331 B2 | 5/2010 | Gerner | |
| 7,714,798 B2 | 5/2010 | Lashmore et al. | |
| 7,745,528 B2 | 6/2010 | Prud'Homme et al. | |
| 7,898,079 B2 | 3/2011 | Lashmore et al. | |
| 7,993,620 B2 | 8/2011 | Lashmore et al. | |
| 8,070,859 B2 | 12/2011 | Ma | |
| 8,110,026 B2 | 2/2012 | Prud'Homme et al. | |
| 2001/0052290 A1* | 12/2001 | Nagai | 96/6 |
| 2007/0137477 A1 | 6/2007 | Freeman et al. | |
| 2007/0261553 A1* | 11/2007 | Gerner | 96/6 |
| 2008/0099400 A1 | 5/2008 | Nemser et al. | |
| 2008/0306184 A1* | 12/2008 | Harmon et al. | 523/136 |
| 2009/0044848 A1 | 2/2009 | Lashmore et al. | |
| 2009/0117025 A1 | 5/2009 | Lashmore et al. | |
| 2009/0215344 A1 | 8/2009 | Lashmore et al. | |
| 2009/0277897 A1 | 11/2009 | Lashmore et al. | |
| 2009/0321355 A1* | 12/2009 | Ratto et al. | 210/651 |
| 2010/0009165 A1* | 1/2010 | Patel et al. | 428/323 |
| 2010/0210781 A1* | 8/2010 | McAndrew et al. | 524/495 |
| 2010/0324656 A1 | 12/2010 | Lashmore et al. | |
| 2011/0008706 A1 | 1/2011 | Cipollini | |
| 2011/0045274 A1* | 2/2011 | Bao et al. | 428/297.4 |
| 2011/0100817 A1 | 5/2011 | Dorairaj et al. | |
| 2011/0111279 A1* | 5/2011 | Smithyman et al. | 429/122 |
| 2011/0226697 A1* | 9/2011 | McLellan et al. | 96/6 |
| 2011/0253630 A1 | 10/2011 | Bakajin et al. | |
| 2011/0290730 A1 | 12/2011 | Ratto et al. | |
| 2011/0316183 A1 | 12/2011 | Lashmore et al. | |
| 2012/0097612 A1 | 4/2012 | Bowser et al. | |
| 2012/0190091 A1 | 7/2012 | Huang et al. | |
| 2012/0241371 A1* | 9/2012 | Revanur et al. | 96/11 |
| 2013/0015122 A1* | 1/2013 | Awadh | 210/500.21 |
| 2014/0097146 A1 | 4/2014 | Shah et al. | |
| 2014/0209539 A1* | 7/2014 | El Badawi et al. | 210/651 |
| 2014/0322518 A1* | 10/2014 | Addleman et al. | 96/11 |

FOREIGN PATENT DOCUMENTS

| | | |
|---|---|---|
| WO | 9503949 | 2/1995 |
| WO | 2004067133 | 8/2004 |
| WO | 2008028155 | 3/2008 |
| WO | 2010080753 | 7/2010 |
| WO | 2011158925 | 12/2011 |

OTHER PUBLICATIONS

Dumée et al., "The Role of Membrane Surface Energy on Direct Contact Membrane Distillation Performance", Desalination vol. 323, Aug. 5, 2012, p. 22-30.

Dumée et al., "The Impact of Hydrophobic Coating on the Performance of Carbon Nanotube Bucky-Paper Membranes in Membrane Distillation", Desalination, vol. 283, Feb. 28, 2011, pp. 64-67.

Zhang et al., "Gas Transport in Vertically-Aligned Carbon Nanotube/ Parylene Composite Membranes", Carbon. vol. 66, Aug. 17, 2013, pp. 11-17.

Search Report and Written Opinion issued Dec. 18, 2014 for European Patent Application 14171507.8.

* cited by examiner

CARBON NANOTUBE COMPOSITE MEMBRANE

FIELD OF THE INVENTION

The present invention relates to gas separation and ion transport membranes generally, and more particularly to a composite membrane structure having a backbone of an array of nanotubes.

BACKGROUND OF THE INVENTION

A long list of polymers have been studied in the past for their utility in the formation of membranes for a variety of purposes. Of importance to the present invention is the use of such polymer membranes for separations and selective transport to modify a feed material and/or to recover one or more target species from the feed material. A host of polymers have been determined to be useful for such applications, with each material exhibiting its own benefits and drawbacks for particular membrane separation and transport applications.

An application of particular interest to the Applicant is the degassing of liquids through contact with a gas-permeable, liquid-impermeable membrane. Such liquid-gas contactors typically rely upon Henry's Law of partial pressures and Ficke's law of diffusion to drive gas transport through the membrane, while small pore size, or the absence of through-pores in a "nonporous" media, restricts or prevents liquid transport through the membrane. The development of fluoropolymers has greatly aided the membrane liquid degassing field by providing membrane polymers that are generally inert, and can be formed into a gas-permeable, liquid-impermeable membrane structure. A particular fluoropolymer of note is a class of amorphous perfluoropolymers, such as those available from Du Pont under the trade name "Teflon®", as well as other amorphous fluoropolymers available from Asahi Glass Corporation and Solvay Solexis. Such materials are oftentimes employed in gas separation membranes for their inertness and high permeability characteristics. Membranes are typically selected for a combination of their compatibility with the contacting materials, their permeability to the targeted transport species, and their selectivity of one molecule over another. It has been shown that, while membrane selectivity may be constant as a function of the membrane thickness, the throughput (permeance) changes inversely to the thickness of the membrane. As a result, a thinner membrane is typically desired, but is limited by the decreased strength and durability as membrane thickness is reduced. It is therefore an ongoing challenge to obtain selective membranes that have the highest possible permeance without being unduly fragile. Such membranes should also be resistant to fouling, degradation, or other performance deterioration.

Membrane engineers have attempted to employ fragile membranes with desired performance properties by supporting the selective membranes with a support structure. A variety of reinforcing support structures have been previously implemented, but are typically difficult to handle, expensive, and/or degrade the performance of the primary selective membrane. Suitable structural reinforcements to thin film membranes that avoid these drawbacks have yet to be defined.

Reinforcement materials for thin film membranes have typically been in the form of lattice structures, support films, and particulate dopants. One material that has been extensively studied for its strengthening properties, though not in thin film separation membranes, is carbon nanotubes, which are recognized as a high-strength material, deriving their strength from its native $sp^2$ bond structure. The electron cloud associated with the $sp^2$ bonding structure functions as an interaction between proximate carbon nanotubes, such that nanotubes may be formed into coherent sheets, tapes, ribbons, ropes, and other macrofabrics, with a tensile strength that is sufficient to facilitate handling.

Internanotube forces have been noted so long as the nanotubes are well associated wherein the surfaces of proximate nanotubes can interact. The particular method of forming nanotubes into such sheets, tapes, and the like, however, can greatly affect the strength of the so-formed macro-scale nanotube structures. Carbon nanotube arrays in a sheet form are commonly known as "buckypaper", referring to the mechanical structure of carbon nanotubes as described by Buckminster Fuller. Generally, the bonding interactions among the nanotubes are insufficient to form a buckypaper that has commercial use on its own. However, carbon nanotubes have been described as a dopant to various materials, including polymers, by mixing carbon nanotube powder into the polymer. Typically, researchers seek improved strength and/or electrical conductivity when doping polymers with carbon nanotubes.

Strength reinforcement materials, including glass fibers, carbon fibers, metal fibers, carbon nanotubes, and the like, when conventionally added as a dopant material, are dependent upon surface energy compatibility between the dopant material and the matrix for the degree of strength enhancement. Matching of the respective surface energies permits van der Walls interactions to assist in the load transfer between the dopant and the matrix. In some cases, surface energy matching is not possible without chemical modification of the reinforcing material, which chemical modification can be expensive or even impossible.

Recently, a reverse approach has been attempted, wherein a buckypaper is infused with a polymer to maintain the native strength of the carbon nanotube sheet derived from the van der Walls interactions among the nanotubes. An example of such an approach is described in U.S. Pat. No. 7,993,620, herein incorporated by reference. The non-woven carbon nanotube fabric described in U.S. Pat. No. 7,993,620 may be incorporated into composite structures by impregnating the non-woven fabric with a matrix precursor, and allowing the matrix to polymerize or thermally cure. Such composites have been described for use in impact-resistant applications, such as sporting goods protection devices, including helmets. Other carbon nanotube fabric composites are described in U.S. Patent Application Publication No. 2010/0324565, also incorporated herein by reference.

The example carbon nanotube fabric structure described above for the formation of composites is described in detail in U.S. Patent Application Publication Nos. 2009/0215344, and 2011/0316183, while an apparatus useful to synthesize nanotubes of such carbon nanotube fabrics is described in U.S. Patent Application Publication No. 2009/0117025, each of which are incorporated herein by reference.

Though composites of carbon nanotube fabrics and infused polymers have been demonstrated, the Applicant is unaware of such composites prepared as a thin film membrane for, as an example, separations. One explanation for the lack of work in this area may be due to the expectation that carbon nanotube fabrics would act similarly to other reinforcement structures that interfere with the overall permeability of the composite structure. It is well know that solid portions of conventional thin film support structures often reduce permeance performance as compared to the neat thin film separation membrane.

It is therefore an object of the present invention to provide a composite structure that exhibits desired tensile strength with a substantially reduced effective polymer film thickness.

It is another object of the present invention to provide a composite membrane incorporating a nanotube reinforcement structure that does not significantly degrade permeation performance of the separation polymer matrix.

SUMMARY OF THE INVENTION

By means of the present invention, a thin membrane for separations may be prepared with significantly less polymer material while maintaining, or even enhancing strength properties of the membrane. By reducing the polymer usage, separation membrane cost may correspondingly be significantly reduced. To realize the reduction in effective polymer film thickness, a reinforcement structure is employed that surprisingly does not substantially interfere with the permeability of the polymer matrix. The reinforcement structure of this composite membrane is a non-woven carbon nanotube fabric that is single or multiple layers, while the carbon nanotubes are intermingled in random orientations.

In one embodiment, the composite membrane of the present invention includes a fabric having a non-woven array of intermingled carbon nanotubes, and a polymer matrix incorporated with the fabric to form a non-porous, permeable composite having a target gas permeance of at least 0.1 gas permeance units (GPU).

In another embodiment, a system for separating a target gas from a liquid includes a housing defining a chamber, and a composite membrane separating the chamber into a permeate side and a retentate side. The housing includes an inlet and an outlet opening to a retentate side of the chamber, and a gas port opening to the permeate side of the chamber. The composite membrane is capable of separating the target gas from the liquid, and includes a fabric of a non-woven array of intermingled carbon nanotubes.

A method for separating a target gas from a liquid includes providing a housing defining a chamber, and a composite membrane separating the chamber into a permeate side and a retentate side. The housing includes an inlet and an outlet opening to the retentate side of the chamber. The composite membrane includes a fabric of a non-woven array of intermingled carbon nanotubes and a dopant incorporated with the fabric to form a non-porous, permeable composite with the fabric. The composite exhibits a permeance of at least 0.1 gas permeance units (GPU) to the target gas. A liquidous fluid containing the target gas is delivered to the retentate side of the chamber through the inlet, and the permeate side of the chamber is conditioned to exert a first partial pressure of the target gas that is less than a second partial pressure of the target gas in the liquidous fluid in the retentate side.

In a further embodiment, a method for transporting ionic species across a barrier between a first fluid and a second fluid includes providing a housing defining a chamber, and a composite membrane defining the barrier and separating the chamber into a first side and a second side. The composite film includes a fabric of a non-woven array of intermingled carbon nanotubes and a polymer incorporated with the fabric to form a non-porous, permeable composite. The first fluid may be delivered to the first side of the chamber, and the second fluid may be delivered to the second side. A driving force is applied to motivate the ionic species across the barrier.

DETAILED DESCRIPTION OF THE PREFERRED EMBODIMENTS

Figure 1:
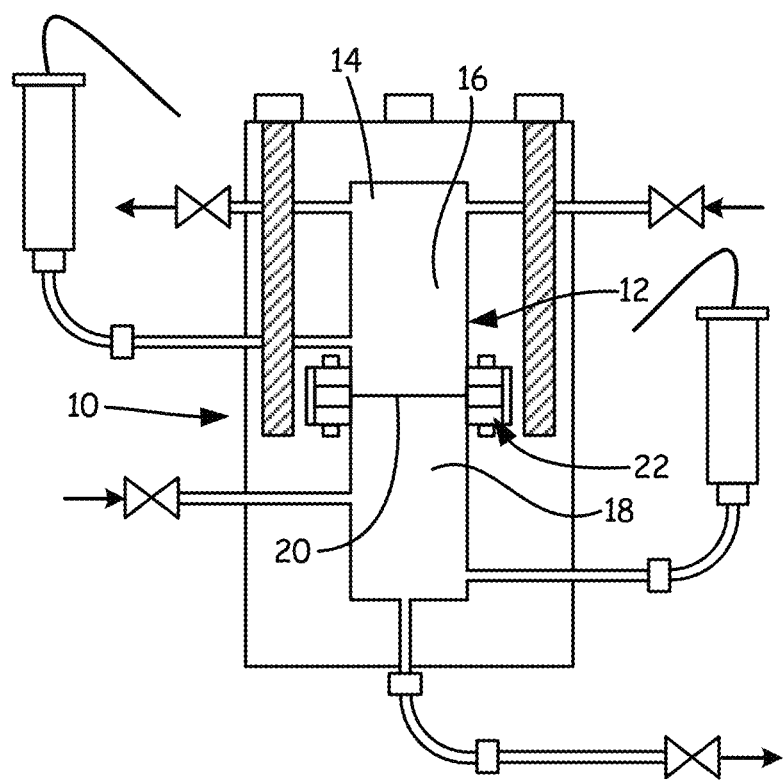
FIG. 1 is a schematic illustration of a testing apparatus for testing permeability, permeance, and gas selectivity of composite films of the present invention.

The objects, features, and advances represented by the present invention will now be presented in terms of detailed embodiments. Other embodiments and aspects of the invention are recognized as being within the grasp of those having ordinary skill in the art.

For the purposes hereof, the term "nanotubes" is intended to mean single wall or multiple wall tubular structures having a diameter in the range of about 1-100 nanometers (nm), and a length in the range of about 0.001-10 millimeters (mm) The nanotubes described in the experimental section hereof are multiple wall carbon nanotubes typically having a diameter of between about 1-25 nanometers (nm), and a length of between about 0.1-5 millimeters (mm) Both single wall and multiple wall carbon nanotubes, however, are well understood in the art and are contemplated as being useful in the present invention.

For the purposes hereof, the term "membrane" is intended to mean a barrier structure that is capable of permitting selective transport thereacross. A "composite membrane" is a membrane structure having two or more bodies coordinating with one another in a single membrane structure. The bodies may be comprised of the same or different materials, and are exemplified in this description as a polymer matrix body incorporated with a carbon nanotube fabric.

For the purposes hereof, the term "non-porous" is intended to mean that the subject body is substantially free from open pathways extending continuously from one side of the composite film to the other. A "pore" is defined as an opening by which matter passes through a wall or membrane. Thus, the term "non-porous" is intended to mean the absence or substantial absence of pores. With regard to carbon nanotubes, a "pore" could be defined as a lumen of a carbon nanotube that extends through the thickness of the composite membrane to provide a pathway through the composite membrane. The non-porous composite membranes of the present invention are free from such lumenal pathways through the composite membrane.

For the purposes hereof, the term "permeable" is intended to mean transport through the composite membrane that relies upon a solution-diffusion mechanism, and not as a result of porosity in the structure permitting material transport through the composite membrane without a solution-diffusion mechanism.

As described above, carbon nanotubes have been employed in numerous applications, primarily as a mechanical strengthening agent. In some of such applications, however, the addition of carbon nanotubes has resulted in a significant reduction in polymer film permeability. Indeed, nanoparticles have been demonstrated and intentionally used to limit permeability in a substrate, such as in U.S. Pat. No. 7,745,528 and U.S. Patent Application Publication No. 2007/0137477. Consequently, the Applicant's finding that a carbon nanotube support structure to a polymer film does not significantly inhibit permeability performance is a surprising result of the present invention.

A "buckypaper" found by the Applicant to be useful in the composite membranes of the present invention are available from Nanocomp Technologies, Inc. of Merrimack, N.H. The Nanocomp buckypapers are described in, for example, U.S. Patent Application Publication Nos. 2011/0316183 and 2009/0215344, as well as U.S. Pat. No. 7,993,620 as a non-woven fabric of intermingled nanotubes generated through chemical vapor deposition (CVD) or other gas phase pyrolysis procedure, the contents of which patents and patent applications being incorporated herein by reference. The intermingled nanotubes are randomly dispersed in a random orientation in the non-woven fabric, with the fabric being comprised of multiple layers of randomly-oriented non-woven nanotubes that, taken together, form the carbon nanotube fabric. The nanotubes making up the tested non-woven fabric included multiple wall nanotubes having an outside diameter of approximately 10-15 nm, and a length of between about 0.1-5 mm randomly arranged within layers of a multiple layer non-woven fabric weighing between 1-20 g/m². The example nanotube fabrics have between 5-95% open structure, and more preferably between 30-70% open structure, with a thickness of between 1-50 micrometers.

A wide host of polymers may be incorporated with the nanotube fabric to form the composite membranes of the present invention. The polymers described in the following examples were selected for their inertness and relatively high gas permeabilities. It is to be understood, however, that other materials, including other polymers, polymer blends, and non-polymers may be utilized in the formation of the composite membranes of the present invention. The selected dopant material is preferably capable of depositing within the open interstitial space of the nanotube fabric to an extent to form a nonporous but permeable composite structure having a target gas permeance of at least 0.1 gas permeation units (GPU). In this manner, the composite membrane may be useful in a variety of separations applications, including gas-gas, gas-liquid, and liquid-liquid separations.

The permeability, permeance, and gas selectivity measurements of target gasses, such as nitrogen, oxygen, and carbon dioxide, may be obtained using a constant volume/variable pressure apparatus. An example testing arrangement is illustrated in FIG. 1, wherein a testing apparatus 10 includes a cell 12 having a chamber 14 that is divided into an upper compartment 16 and a lower compartment 18 by the membrane 20 being tested. The tested membranes were each 0.95 cm² held in place by a clamp 22. Upper compartment 16 had a volume of greater than 1000 cm³, while lower compartment 18 had a volume of 25 cm³. To test membrane 20, both compartments 16, 18 are first purged with an identical gas for about 30 min, followed by an additional 100 kPa of the gas added to upper compartment 16. The pressure of both compartments 16, 18 is measured with two Omegadyne model PX 209-015G5V pressure transducers as a function of time. The pressure of upper compartment 16 does not change during the test. When the rate of pressure increase on the lower compartment 18 reaches its pseudo-steady-state, the permeability was calculated as follows:

$$P = \frac{(22414)(l)(V)}{(A)(\delta P_0)(RT)} \times \frac{dp}{dt}$$

Where $\delta P_0$=initial pressure difference between upper compartment 16 and lower compartment 18 (cm Hg)
V=volume of lower compartment 18 (cm³)
l=thickness of membrane 20 (cm)
A=area of membrane 20 (cm²)
T=absolute temperature (K)
R=universal gas constant $\frac{dp}{dt}$ = the rate of pressure increase on lower compartment 18 at pseudo-steady-state(cm Hg/sec.)

Tensile strength testing was performed using an Instron model #3345 equipped with a 1000 Newton or 5000 Newton load cell and a computer system operating Instron series IX/S software. Corrections for Poissons ratio were not made.

TABLE 1

| Case | Manufacturer | Type | Measurement Source | Thickness, (microns) | Specimen width (mm) | Specimen length (mm) | Pull Rate (mm/min) | Tensile Strength (GPa) |
|---|---|---|---|---|---|---|---|---|
| 1 | Nanocomp | Generic | Nanocomp | Generic Thickness | Unknown | Unknown | 1.27 | 0.329 (mean value) |

TABLE 1-continued

| Case | Manufacturer | Type | Measurement Source | Thickness, (microns) | Specimen width (mm) | Specimen length (mm) | Pull Rate (mm/min) | Tensile Strength (GPa) |
|---|---|---|---|---|---|---|---|---|
| 2 | Nanocomp | 20 gram/m² | Instron | 72 | 25.4 | 25.4 | 1.27 | 0.92 |
| 3 | Nanocomp | 10 gram/m² | Instron | 25 | 25.4 | 25.4 | 1.27 | 0.229 |
| 4 | Nanocomp | 5 gram/m² | Instron | 9 | 25.4 | 25.4 | 1.27 | 0.307 |

Tensile strengths approaching those reported by the manufacturer were observed as the thickness of the nanotube fabric decreased. This may be due to the many layers of material used to make the higher weight fabrics and the apparent reduced density.

To determine the improvement in tensile strength achieved by incorporating polymers with the nanotube fabrics, the tensile strength of the individual polymers were tested and compared to literature values where available. Extruded polymer film was obtained from BioGeneral, Inc. of San Diego, Calif.

TABLE 2

| Manufacturer | Type | Measurement Source | Thickness (microns) | Specimen width (mm) | Specimen length (mm) | Pull Rate (mm/min) | Tensile Strength (GPa) |
|---|---|---|---|---|---|---|---|
| DuPont | Teflon AF™ 2400 | Cast film | Ca. 100 | Hysitron TI 750 nanoindenter* | | | 1.7 |
| DuPont | Teflon AF™ 2400 | BioGeneral Extruded Film | 72 | 25.4 | 25.4 | 1.27 | 1.7 |
| Solvay Solexis | Hyflon AD60™ | Cast film | 25 | 25.4 | 25.4 | 1.27 | 0.53 |
| DuPont | Nafion™ 2020 | Literature - film | 9 | | | | $7.35 \times 10^{-4}$ |

Each of the polymers listed in Table 2 were prepared as impregnatable solutions as follows:

TABLE 3

| Type | Polymer | Solvent | Weight percent |
|---|---|---|---|
| 1 | Teflon AF™ 2400 | FC-770™ | 3.5 |
| 2 | Teflon AF™ 2400 | FC-770™ | 2.5 |
| 3 | Teflon AF™ 2400 | FC-770™ | 1 |
| 4 | Hyflon AD-60™ | FC-770™ | 2.5 |
| 5 | Hyflon AD-60™ | FC-770™ | 10 |
| 6 | Dupont Nafion™ 2020 | Neat | 100 |
| 7 | Dupont Nafion™ 2020 | Isopropanol | 50 |

Various manual methods were used to impregnate the polymer solutions of Table 3 into the nanotube fabrics of Table 1. The following table sets forth initial observations of the composites.

TABLE 4

| Case | Polymer Solution (from Table 3) | Fabric type (from Table 1) | Coating Method | Drying Method | Composite Membrane Appearance |
|---|---|---|---|---|---|
| 1 | 2 | 3 | 72 hour soak | Ambient | Stable, strong composite both wet and dry |
| 2 | 2 | 4 | 72 hour soak followed by mechanical impregnation | Ambient and oven at 60° C. | Stable, strong composite both wet and dry |
| 3 | 4 | 3 | 72 hour soak followed by mechanical impregnation | Ambient and oven at 60° C. | Stable, strong composite both wet and dry |
| 4 | 5 | 4 | 72 hour soak followed by mechanical impregnation | Ambient and oven at 60° C. | Stable, strong composite both wet and dry |
| 5 | 7 | 4 | 72 hour soak followed by mechanical impregnation | Ambient and oven at 60° C. | Stable, strong composite both wet and dry |

The following examples illustrate composite membranes of the present invention, but are not intended to be limiting as to the materials and methods of formation for such membranes.

Example 1

The composite membrane of Case 1 from Table 4 was prepared by dip coating the carbon nanotube fabric in the polymer solution for 72 hours while stretched over an aluminum frame. Following submersion for 72 hours, the composite material was withdrawn from solution and held in an atmosphere saturated with FC-770 solvent to prevent drying of the composite, and the excess solution was allowed to drain from the surface of the wet composite. The composite was then allowed to dry under ambient conditions under sufficient tension to remove wrinkles.

The dried composite membrane was then laser cut into one inch by two inch samples for tensile strength measurements, permeability and permeance testing, and scanning electron microscopy. The following Table 5 sets forth testing results of the composite membrane, in comparison to neat polymer films formed from Teflon® AF-2400 through extrusion, solution casting, melt pressing, and laboratory bench casting.

TABLE 5

| Type | Thickness (Microns) | Tensile (GPa) | Permeability, Barrer | | | Permeance (GPU) (1.1 cm dia) | | | O2/N2 ratio |
|---|---|---|---|---|---|---|---|---|---|
| | | | O2 | N2 | CO2 | O2 | N2 | CO2 | |
| Solution Cast | n/a | — | 1600 | 780 | 3900 | — | — | — | 2.05 |
| Melt Pressed | — | — | 990 | 490 | 2800 | — | — | — | 2.02 |
| Extruded | 38 | 1.7 | 585 | 273 | 1500 | 1.6 | .75 | 4.17 | 2.14 |
| Cast | 19 | n/a | 882 | 446 | 2080 | 46.6 | 23.5 | 109 | 1.97 |
| Composite Membrane (Table 4, Case 1) | 34 | 5.5 | 1870 | 1040 | 3550 | 55 | 31 | 104 | 1.79 |
| Reduced Film Data | 17 | — | 934 | 521 | 1772 | Mathematically equivalent to composite membrane | | | 1.79 |

The solution cast and melt pressed data are found in the literature, while the extruded film was sourced from BioGeneral, Inc.

Each of the laser-cut composite membranes was weighed to the nearest 0.1 mg, and the thickness determined to the nearest micrometer.

To determine the "reduced film data", the weight of the carbon nanotube fabric was subtracted from the total composite weight to determine the amount of polymer remaining within the composite structure. The weight of polymer was converted to an equivalent film thickness by density correcting the weight to volume using a factor of 1.78 grams of polymer per $cm^3$. An equivalent film thickness was then determined by dividing the volume by the length and width of the composite membrane. The gas permeability of the resulting "reduced film" thickness was compared to the gas permeation rates to determine the permeability of the composite membrane if one were to ignore the presence of the carbon nanotube fabric portion of the composite.

Based on Maxwell's Model for spherical particles, which states that the permeability of a composite is related to the fractional composition of each component and its respective permeability, the following relationship is expected:

$$\frac{P_{composite}}{P_{poly}} = \left[\frac{1 - \frac{\phi f}{1}}{1 + \left(\frac{\phi f}{2}\right)}\right]$$

where $P_{composite}$=permeability of the composite
$P_{poly}$=permeability of the pure polymer film
$\phi f$=volume fraction of the filler The nanotubes employed in the example carbon nanotube fabrics are closed-ended, and therefore assumed to have no permeability. One expects to observe a reduction of permeability in accordance to the filler volume fraction. Comparing the barrer values of the composite and those of the "reduced film" indicates that the permeability is nearly the same as if the carbon nanotube fabric was not present. Applicants theorize that the existence of the carbon nanotube fabric in the presence of the polymer does not modify the permeability of a neat polymer film. This theory, however, is not expected according to Maxwell's Model, such that the insubstantial impact of the carbon nanotube fabric to the permeability of the composite is a surprising finding of the present invention.

Moreover, the strengthening effect of the carbon nanotube fabric to the composite, in comparison to the neat polymer, is dramatically greater than expected under the "Rule of Mixtures". Applicant believes that an unexplained interaction between the polymer and the carbon nanotubes is responsible for the unexpected strengthening property demonstrated in the results table.

Figure 2:
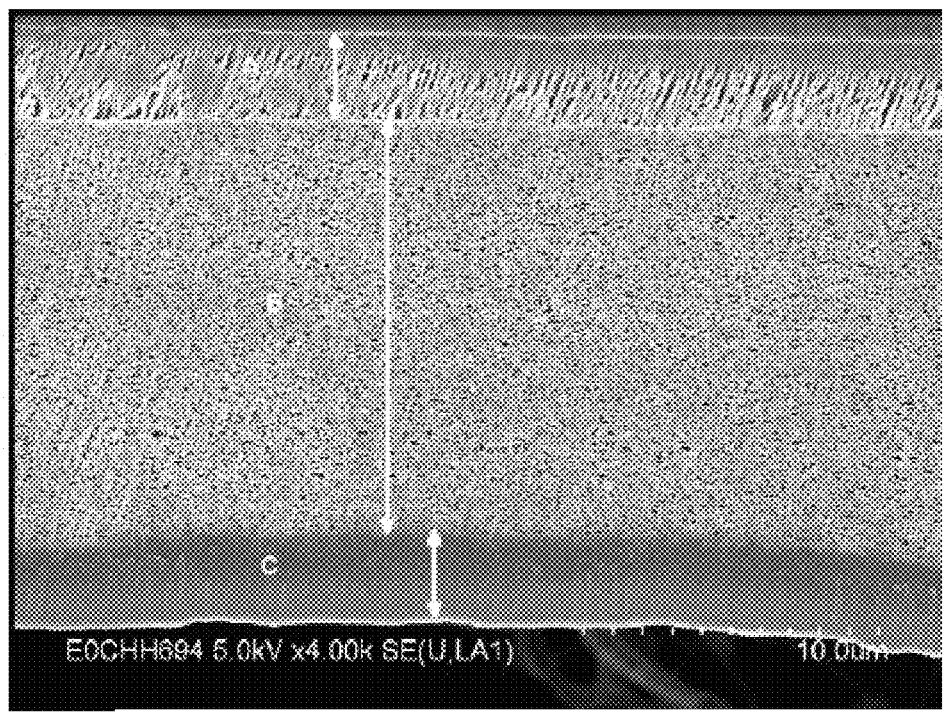
FIG. 2 is a cross-sectional scanning electron microscopy (SEM) image of a composite film of the present invention.

A cross-sectional image of the composite is illustrated in FIG. 2, which shows an asymmetrically formed membrane at section "A" with air inclusions to a depth of approximately four micrometers. Section "B" is approximately 15 micrometers thick, and is the bulk of the composite, while section "C" is an out of focus inner edge of the cross-section.

To further examine the distribution of the polymer through the bulk of the composite, an elemental analysis was performed to account for the concentration of fluorine, which is only available from the polymer and the solvent, through little solvent was expected to remain in the composite post-drying. The elemental analysis results are set forth in the following table, wherein "layer 1" is the epoxy potting compound used to prepare the sample for ion milling:

TABLE 6

| Layer | Thickness (microns) | Carbon | Fluorine | Oxygen | Observed Material Composition |
|---|---|---|---|---|---|
| 1 | 8 | 80 | 0 | 10 | Epoxy Potting Compound |
| 2 | 4 | 30 | 70 | 0 | Teflon AF 2400 + Fabric |

TABLE 6-continued

| Layer | Thickness (microns) | Carbon | Fluorine | Oxygen | Observed Material Composition |
|---|---|---|---|---|---|
| 3 | 15 | 80 | 20 | 0 | Fabric + Teflon AF 2400 or FC-770 |
| 4 | 4 | 0 | 0 | 0 | Unfocused inner edge |

The composite of this Example 1 exhibits a surprisingly higher tensile strength than either the base carbon nanotube fabric or the polymer in a neat film format. Moreover, the permeability of the composite membrane is also surprisingly unobstructed by the carbon nanotube fabric, contrary to what would be expected under Maxwell's Model.

Example 2

The composite membrane described in Case 2 of Table 4 was prepared by soaking the carbon nanotube fabric in solution for 72 hours. Following soak, the composite was pressed while in the presence of polymer solution, and subsequently placed on a glass surface. Excess polymer solution was removed from the composite using a squeegee while compressing the composite surface to ensure the polymer solution beneath the composite against the glass was minimized and to remove air bubbles regained between the glass surface and the composite membrane. The composite membrane was then dried at ambient, followed by oven drying at 60° C. for four hours.

The following table sets forth strength, permeability, and permeance results for the composite membrane:

TABLE 7

| Type | Thickness (Microns) | Tensile (GPa) | Permeability (Barrer) | | | Permeance, (GPU) (1.1 cm dia) | | | $O_2/N_2$ ratio |
|---|---|---|---|---|---|---|---|---|---|
| | | | O2 | N2 | CO2 | O2 | N2 | CO2 | |
| Extruded | 38 | 1.7 | 585 | 273 | 1500 | 1.6 | .75 | 4.17 | 2.14 |
| Cast | 19 | n/a | 882 | 446 | 2080 | 46.6 | 23.5 | 109 | 1.97 |
| Composite Membrane (Table 4, Case 2) | 13 | 5.96 | 1740 | 900 | 4590 | 134 | 70 | 353 | 1.93 |
| Reduced Film Data | Equivalent to 9 microns | n/a | 940 | 490 | 2470 | | | | 1.93 |

The permeability of the composite membrane closely matches the solution cast film permeability described in Table 5 with reference to a Teflon® AF 2400 film, as that employed in the present Example. In this instance, the weight of polymer remaining in the composite membrane is equivalent of a 9 micrometer neat polymer film thickness.

Figure 3:
FIG. 3 is a cross-sectional SEM image of a composite film of the present invention.
Figure 4:
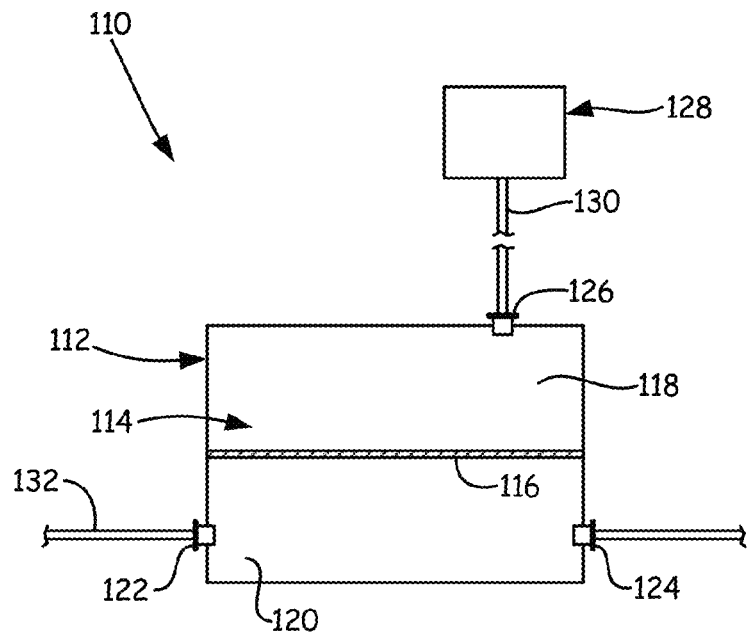
FIG. 4 is a schematic illustration of a membrane separation system of the present invention.

An ion-milled portion of the composite membrane was further examined under electron microscopy. The impregnation technique followed in this example closely matches a cast film in $O_2/N_2$ selectivity, and yet is stronger. An image of the electron microscopy of this composite membrane is shown in FIG. 3. Elemental analysis of the layers illustrated in FIG. 3 is set forth in the following table:

TABLE 8

| Layer | Thickness (microns) | Carbon | Fluorine | Oxygen | Observed Material Composition |
|---|---|---|---|---|---|
| 1 | 8 | 80 | 0 | 20 | Epoxy Potting Compound |
| 2 | <1 | 30 | 70 | 0 | Teflon AF 2400 + Fabric |
| 3 | 2 | 50 | 50 | 0 | Fabric + Teflon AF 2400 or FC-770 |
| 4 | 4 | 0 | 0 | 0 | epoxy |

The elemental analysis shows a distribution of the polymer throughout the thickness of the composite membrane, though the polymer concentration in this Example 2 appears to be higher throughout the thickness of the composite membrane in comparison to the composite membrane of Example 1. The elevated polymer concentration may be attributed to the mechanical force applied to the composite membrane in the fabrication technique described in this Example 2.

Example 3

A composite membrane in accordance with Case 3 of Table 4 was prepared using the procedure of Example 2. The tensile strength of the composite membrane was compared to a membrane cast from Solution 5 of Table 3:

TABLE 9

| Membrane | Tensile Strength (GPa) | Notes |
|---|---|---|
| Polymer only (Table 3, Type 5) | 0.99 | Pure polymer |
| Composite Membrane (Table 4, Case 3) | 6.95 | Hyflon AD-60 composite with 10 gram/m² Nanocomp fabric |

Example 4

A composite membrane in accordance with Case 4 of Table 4 was prepared using the procedure set forth in Example 2, and compared to a polymer cast film of the solution of Table 3, Type 5. Permeation testing of the composite membrane exhibited low selectivity, due to the extremely low permeability of the utilized polymer.

TABLE 10

| Type | Permeability, Barrer | | | Permeance (GPU) (1.1 cm dia) | | | O2/N2 ratio |
|---|---|---|---|---|---|---|---|
| | O2 | N2 | CO2 | O2 | N2 | CO2 | |
| Solution Cast (Table 3 Type 5) | 51.4 | 16.5 | 125 | — | — | — | 3:1 |
| Composite Film (Table 4, Case 4) | 80 | 60 | 190 | 4.9 | 3.7 | 11.5 | 1.3:1 |

The data from the "solution cast" neat polymer film was taken from literature.

Example 5

A composite membrane in accordance with Case 5 of Table 4 was prepared using the procedure set forth in Example 2. The composite membrane was tested for strength in both dry and water-saturated conditions, and compared to films of the neat polymer.

TABLE 11

| Membrane Type | Tensile Strength (GPa) | Notes |
|---|---|---|
| Nafion 2020 (Table 3, Type 6) | 7.35*10$^{-4}$ | Literature Value |
| Nafion 2020 Cast (Table 3, Type 6) (dry) | 0.280 | Cast from 100% solution |
| Composite Film (Table 4, Case 5) (dry) | 7.8 | Dry Film |
| Composite Film (Table 4, Case 5) (wet) | 2.56 | Water Saturated |

The polymer utilized in this example includes a sulfonated tetrafluoroethylene that is commonly used in ion exchange membranes to permit ionic species to migrate thereacross. The example composite membrane may therefore permit transport of cations thereacross, substantially to the exclusion of anions and electrons. Moreover, although the polymer is commonly used in ion conductive membranes, films formed from such polymer are also typically highly selective to carbon dioxide ($CO_2$), thereby rendering it a good candidate material for carbon sequestration applications. However, the dry composite membrane is not expected to demonstrate desired gas permeability or selectivity, because the sulfonic acid regions of the sulfonated tetrafluoroethylene polymer must be hydrated so that carbon dioxide can be transported as the dissolved carbonate base, $CO_3^{-2}$. The sulfonic acid portion of the polymer in the composite membrane may then carry the ionic species across the barrier.

Example 6

To further enhance ion conductivity of the composite membrane of Example 5, a carbon nanotube fabric of Table 1, Case 4 was chemically modified in a closed flask with 100 mL reagent grade $H_2SO_4$ and heated to the sulfuric acid boiling point while covered. The temperature was then reduced to about 275° C., and the carbon nanotube fabric was allowed to react in the sulfuric acid for four hours. The mixture was then allowed to cool to room temperature, and was thereafter maintained at room temperature for 72 hours. The modified carbon nanotube fabric was removed from the sulfuric acid and rinsed with deionized water until the rinse water showed a pH>5.

Visual examination of the modified carbon nanotube fabric indicated that it was easily wetted by water. The modified carbon nanotube fabric was oven dried at 60° C. for four hours. The modified carbon nanotube fabric was then impregnated with polymer solution 7 in accordance with the procedure of Example 2.

The composite membrane was tested for strength in both a wet and dry state:

TABLE 12

| Membrane Type | Tensile Strength (GPa) |
|---|---|
| Nafion 2020 (Literature) | 7.35 × 10$^{-4}$ |
| Water wet Composite Film | 2.6 |
| Dry Composite Film | 2.56 |

The composite membrane was also tested for permeability with wet paper towels placed in the space above and below the wet composite membrane to maintain humid conditions during permeability testing.

TABLE 13

| Membrane Type | Membrane Thickness Microns | Permeability, (Barrer) | | Permeance, (GPU) (1.1 cm dia) | | CO2/N2 ratio |
|---|---|---|---|---|---|---|
| | | N2 | CO2 | $N_2$ | CO2 | |
| Solution Cast | 38 | 1 | 300 | — | — | 300:1 |
| Water wet Composite Membrane | 11 | 4.7 | 224 | 0.4 | 20 | 50:1 |
| Reduced Film Data | 4 | 18 | 850 | | | |

Applications

An example application for the composite membranes of the present invention is in gas/gas, gas/liquid, and/or liquid/liquid separations. In one embodiment, a system 110 for separating a target gas from a liquid includes a housing 112 defining a chamber 114, and a composite membrane 116 separating chamber 114 into a permeate side 118 and a retentate side 120. Housing 112 includes an inlet 122 and an outlet 124 opening to retentate side 120 of chamber 114. Housing 112 may further include a gas port 126 opening to permeate side 118 of chamber 114. System 110 may include a pump 128 for evacuating permeate side 118 of chamber 114 through gas port 126, with pump 128 being fluidly connected to gas port 126 through, for example, pipe 130.

A liquidous fluid containing the target gas may be delivered to retentate side 120 of chamber 114 through inlet 122 via pipe 132. It is to be understood that the term "pipe", as used herein, is not intended to be limiting, and may include any conveyance member of suitable size, configuration, and material to permit the conveyance of fluid to an intended destination.

Composite membrane 116 may be suitably configured to be capable of separating the target gas from the liquid at retentate side 120, and may preferably form a non-porous, permeable barrier exhibiting a permeance of at least 0.1 gas permeance units (GPU) to the target gas. As is well known in the art, separation of the target gas from the liquid at retentate side 120 can be driven by the conditions at permeate side 118 of chamber 114. Accordingly, permeate side 118 of chamber 114 may be conditioned to exert a first partial pressure of the target gas that is less than a second partial pressure of the target gas in the liquidous fluid in retentate side 120 of chamber 114. Pursuant to Henry's Law of partial pressures and Ficke's law of diffusion, the target gas may be driven across the barrier defined by the nonporous composite film 116. Pump 128 may be operated to condition permeate side 118 of chamber 114, such as by evacuating permeate side 118 to an extent at which the first partial pressure of the target gas is less than the corresponding partial pressure of the target gas in a liquidous fluid at retentate side 120. In this manner, separated target gas permeated into permeate side 118 may be removed from chamber 114 through gas port 126.

Permeate side 118 of chamber 114 may also or instead be suitably conditioned by passing a sweep fluid through permeate side 118, wherein the target gas partial pressure within the sweep fluid is less than the corresponding target gas partial in the liquidous fluid at retentate side 120, so as to generate a driving force for permeation of the target gas through composite membrane 116 to permeate side 118. Such a sweep fluid may be introduced to permeate side 118 through a port in housing 112.

The above example system is not intended to be limiting as to the structures and methods of separations contemplated in the present invention. Gas/gas, gas/liquid, and liquid/liquid membrane separation systems are well known in the art, and are considered to be applicable to the systems and methods of the present invention, which uniquely employs a composite membrane.

Figure 5:
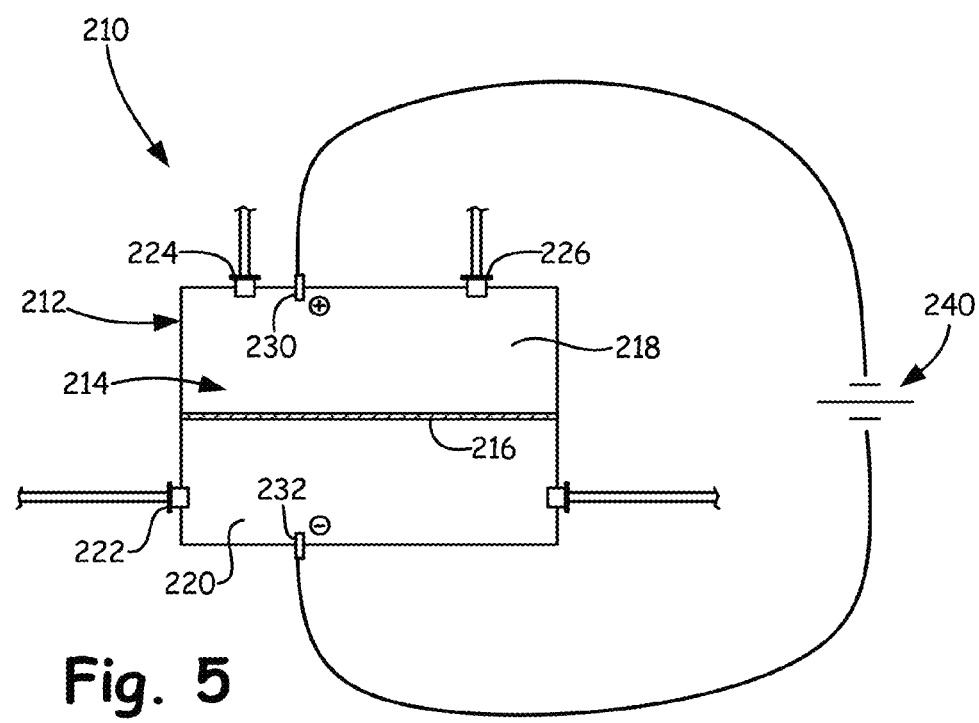
FIG. 5 is a schematic illustration of a membrane ion exchange system of the present invention.

In some embodiments, a composite membrane 216 includes an ionomer that is capable of transporting ionic species from a first fluid to a second fluid on opposed sides of the barrier defined by the composite membrane 216. A system 210 for transporting ionic species across a barrier between a first fluid and a second fluid includes a housing 212 defining a chamber 214, and a composite membrane 216 defining the barrier and separating chamber 214 into a first side 218 and a second side 220. Composite membrane 216 preferably includes a fabric comprising a non-woven array of intermingled carbon nanotubes and a dopant incorporated with the fabric to form a nonporous permeable composite. In some embodiments, the dopant is an ionomer that permits transport of cations across the barrier, substantially to the exclusion of anions and electrons. Such an ion exchange apparatus may be operated by applying a driving force to chamber 214, wherein the driving force is effective to motivate ionic species across the barrier defined by composite membrane 216. In some embodiments, such driving force may be in the form of electrical current generated in chamber 214 between first and second electrodes 230, 232 of opposite polarity. As illustrated in FIG. 5, first and second electrodes 230, 232 are positioned at opposed sides of composite membrane 216, with a first electrode 230 disposed in first side 218 of chamber 214, and second electrode 232 being positioned in second side 220 of chamber 214. First and second electrodes 230, 232 are coupled to an electrical energy source 240 for generating a voltage potential and current passing between first and second electrodes 230, 232. An applied current across composite membrane 216 to motivate ionic species transport is well understood in the art for membrane-based ion exchange systems.

Other driving forces are contemplated as being useful in motivating ionic species transport across composite membrane 216 between a first fluid delivered to first side 220 of chamber 214 through inlet 222, and a second fluid delivered to second side 218 of chamber 214 of inlet 224. In one instance, such a driving force may be generated based upon the properties of the first and second fluids on opposed sides of composite film 216. Most typically, however, membrane-based ion exchange systems employ an applied electrical current as the force driving ion species transport across the membrane.

The invention has been described herein in considerable detail in order to comply with the patent statutes, and to provide those skilled in the art with the information needed to apply the novel principles and to construct and use embodiments of the invention as required. However, it is to be understood that various modifications to the invention may be accomplished without departing from the scope of the invention itself.

What is claimed is:

1. A composite membrane, comprising:
    a fabric comprising a non-woven array of intermingled carbon nanotubes; and
    a polymer matrix incorporated with said fabric to an extent to form a non-porous, permeable composite having a target gas permeance of at least 0.1 GPU.

2. A composite membrane as in claim 1 wherein said fabric has a tensile strength of at least 50 MPa.

3. A composite membrane as in claim 1 wherein said nanotubes are randomly oriented, and each have a diameter of 12-15 nm, and a length of 1-5 mm.

4. A composite membrane as in claim 1 wherein said nanotubes are formed by chemical vapor deposition.

5. A composite membrane as in claim 1 wherein said polymer matrix includes an amorphous fluorocarbon.

6. A system for separating a target gas from a liquid, said system comprising:
    a housing defining a chamber, and a composite membrane separating said chamber into a permeate side and a retentate side, said housing having an inlet and an outlet opening to said retentate side of said chamber, and a gas port opening to said permeate side of said chamber, said composite membrane being capable of separating the target gas from the liquid, and including a fabric comprising a non-woven array of intermingled carbon nanotubes, wherein said composite membrane includes a polymer incorporated with said fabric to an extent sufficient to form a nonporous, permeable composite with said fabric, wherein said composite exhibits a permeance of at least 0.1 GPU to the target gas.

7. A system as in claim 6, including a pump for evacuating said permeate side of said chamber through said gas port.

8. A system as in claim 6 wherein said polymer includes an amorphous fluorocarbon.

9. A method for separating a target gas from a liquid, said method comprising:
(a) providing a housing defining a chamber, and a composite membrane separating said chamber into a permeate side and a retentate side, said housing having an inlet and an outlet opening to said retentate side of said chamber, said composite membrane including a fabric comprising a non-woven array of intermingled carbon nanotubes and a dopant incorporated with said fabric to form a non-porous, permeable composite with said fabric, wherein said composite exhibits a permeance of at least 0.1 GPU to the target gas;
(b) delivering a liquidous fluid containing the target gas to said retentate side of said chamber through said inlet; and
(c) conditioning said permeate side of said chamber to exert a first partial pressure of the target gas that is less than a second partial pressure of the target gas in the liquidous fluid in said retentate side.

10. A method as in claim 9, including removing separated target gas from said permeate side of said chamber through a gas port opening to said permeate side of said chamber.

11. A method as in claim 10, including evacuating said permeate side of said chamber.

12. A method as in claim 11, including connecting a vacuum pump to said gas port for evacuating said permeate side of said chamber.

13. A method for transporting ionic species across a barrier between a first fluid and a second fluid, said method comprising:
(a) providing a housing defining a chamber, and a composite membrane defining the barrier and separating said chamber into a first side and a second side, said composite membrane including a fabric comprising a nonwoven array of intermingled carbon nanotubes and a dopant incorporated with said fabric to form a nonporous, permeable composite;
(b) delivering said first fluid to said first side of said chamber, and said second fluid to said second; and
(c) applying a driving force to said chamber for motivating the ionic species across the barrier.

14. A method as in claim 13 wherein said polymer includes a sulfonated tetrafluoroethylene.

15. A method as in claim 13 wherein said composite membrane permits transport of cations across the barrier, substantially to the exclusion of anions and electrons.

16. A method as in claim 13 wherein said dopant is infused into interstices within said fabric.

17. A method as in claim 13 wherein said driving force is an applied electrical current.

18. A composite membrane as in claim 1 wherein said polymer matrix includes a silicone rubber.

19. A system as in claim 6 wherein said polymer includes a silicone rubber.

* * * * *